(12) United States Patent
Tsai

(10) Patent No.: US 9,991,704 B2
(45) Date of Patent: Jun. 5, 2018

(54) POWER SUPPLY APPARATUS AND POWER SUPPLY METHOD

(71) Applicant: FSP TECHNOLOGY INC., Taoyuan (TW)

(72) Inventor: Chien-Li Tsai, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 434 days.

(21) Appl. No.: 14/667,702

(22) Filed: Mar. 25, 2015

(65) Prior Publication Data

US 2015/0303688 A1    Oct. 22, 2015

(30) Foreign Application Priority Data

Apr. 21, 2014    (TW) .............................. 103114382 A

(51) Int. Cl.
*H02J 9/00*    (2006.01)
*H02J 1/10*    (2006.01)

(52) U.S. Cl.
CPC .................................... *H02J 1/102* (2013.01)

(58) Field of Classification Search
None
See application file for complete search history.

(56) References Cited

U.S. PATENT DOCUMENTS

| 8,963,371 | B2 * | 2/2015 | Kinnard | ................. | H02J 9/061 307/64 |
| 2015/0069842 | A1 * | 3/2015 | Niu | ........................ | H02J 9/061 307/64 |

* cited by examiner

*Primary Examiner* — Long Nguyen
(74) *Attorney, Agent, or Firm* — JCIPRNET

(57) ABSTRACT

A power supply apparatus including a master power converter and a slave power converter is provided. The master power converter generates a main power having a working voltage level. The slave power converter generates an auxiliary power. According to its operation state, the master power converter provides a corresponding control signal to the slave power converter. If the master power converter determines the operation state is a first operation state, the slave power converter generates the auxiliary power having a voltage level lower than the working voltage level, so that the slave power converter can be operated in a no-load conversion state. If the master power converter determines the operation state is a second operation state, the slave power converter raises the voltage level of the auxiliary power to the working voltage level, so that the auxiliary power replacing the main power is supplied to a load.

14 Claims, 8 Drawing Sheets

POWER SUPPLY APPARATUS AND POWER SUPPLY METHOD

CROSS-REFERENCE TO RELATED APPLICATION

This application claims the priority benefit of Taiwan application serial no. 103114382, filed on Apr. 21, 2014. The entirety of the above-mentioned patent application is hereby incorporated by reference herein and made a part of this specification.

Field of the Invention

The invention relates to a power supply technique; more particularly, the invention relates to a power supply apparatus that is able to achieve fast switching of load power and a power supply method thereof.

Description of Related Art

To ensure the stable operation of an electronic system, a power supply apparatus equipped with two or more power converters is employed to supply power to the system in the related art. If one of the power converters becomes dysfunctional, the other power converter(s) may continuously generate power and supply the same to the system, so as to prevent possible data loss or damages caused by termination of power supply to the system.

If the master power converter is in a normal operation state, the slave power converter in most cases enters a sleep mode without performing any power conversion. According to such mechanism, the slave power converter is awaken only when the master power converter becomes dysfunctional; at this time, the awaken slave power converter replaces the master power converter and supplies power to system. As shown in FIG. 13, if the master power converter becomes dysfunctional, the auxiliary power P0 generated by the slave power converter is gradually raised from 0V to the working voltage level V1.

However, the time frame T0 during which the slave power converter in the sleep mode resumes supplying power is often longer than the time frame T2 during which the master power converter becomes dysfunctional and completely stops supplying power. Accordingly, temporary termination of power supply may occur when the power supply to the system is switched from the master power converter to the slave power converter, which may deteriorate the stable operation of the system.

SUMMARY OF THE INVENTION

The invention is directed to a power supply apparatus and a power supply method thereof, whereby a slave power converter is able to quickly replace a master power converter and supply power to a load if the master power converter becomes dysfunctional.

In an embodiment of the invention, a power supply apparatus that includes a master power converter and a slave power converter is provided. The master power converter generates a main power having a working voltage level. The slave power converter is configured to generate an auxiliary power, and the master power converter and the slave power converter are adapted to be coupled to a load in parallel. The master power converter provides a control signal to the slave power converter in response to an operation state of the master power converter. If the master power converter determines the operation state is a first operation state, the slave power converter responds to the control signal and generates the auxiliary power having a voltage level lower than the working voltage level, such that the slave power converter is operated in a no-load conversion state, and the main power is supplied to the load; if the master power converter determines the operation state is a second operation state, the slave power converter responds to the control signal and raises the voltage level of the auxiliary power to the working voltage level, such that the auxiliary power replacing the main power is supplied to the load.

According to an embodiment of the invention, the master power converter further detects changes of the load, so as to provide the corresponding control signal to adjust the voltage level of the auxiliary power.

According to an embodiment of the invention, the master power converter determines whether an output power of the power supply apparatus is less than a predetermined value. If the output power is less than the predetermined value, the master power converter determines the load is a light load; if the output power is greater than or equal to the predetermined value, the master power converter determines the load is a heavy load.

According to an embodiment of the invention, if the load is the heavy load, the slave power converter responds to the control signal and generates the auxiliary power having the working voltage level, such that the main power and the auxiliary power are both supplied to the load. If the load is the light load, the operation state of the master power converter is the first operation state, and the slave power converter responds to the control signal and reduces the voltage level of the auxiliary power to be lower than the working voltage level, such that the slave power converter is operated in the no-load conversion state. If the master power converter supplies power in an abnormal manner, the operation state of the master power converter is the second operation state; at this time, the slave power converter responds to the control signal and raises the voltage level of the auxiliary power to the working voltage level, such that the auxiliary power replaces the main power and is supplied to the load.

According to an embodiment of the invention, the master power converter includes a first conversion circuit and a first control unit. The first conversion circuit is configured to convert power and generate the main power. The first control unit is configured to control power conversion of the first conversion circuit and detect an output state of the first conversion circuit.

According to an embodiment of the invention, the slave power converter includes a second conversion circuit and a second control unit. The second conversion circuit is configured to convert power and generate the auxiliary power. The second control unit is configured to control power conversion of the second conversion circuit and detect an output state of the second conversion circuit.

According to an embodiment of the invention, the first conversion circuit performs AC-DC conversion on an AC power source, so as to generate the main power. The second conversion circuit performs DC-DC conversion on a DC power source, so as to generate the auxiliary power.

According to an embodiment of the invention, the power supply apparatus further includes a transmission channel. The transmission channel is configured to transmit the control signal and power state information between the first control unit and the second control unit. Here, the power state information is associated with the output state of the first conversion circuit and the output state of the second conversion circuit.

According to an embodiment of the invention, the transmission channel includes a first signal line and a second signal line. The first signal line is coupled between the first control unit and the second control unit, and the first control unit and the second control unit share the power state information through the first signal line. The second signal line is coupled between the first control unit and the second control unit, and the first control unit transmits the control signal to the second control unit through the second signal line.

In an embodiment of the invention, a power supply apparatus that includes an AC power converter and a DC power converter is provided. The AC power converter is configured to perform AC-DC conversion on an AC power source, so as to generate a main power having a working voltage level. The DC power converter is configured to perform DC-DC conversion on a DC power source, so as to generate an auxiliary power. The AC power converter and the DC power converter are adapted to be coupled to a load in parallel. The AC power converter provides a control signal to the DC power converter in response to an operation state of the AC power converter. If the AC power converter determines the operation state is a first operation state, the DC power converter responds to the control signal and generates the auxiliary power having a voltage level lower than the working voltage level, such that the DC power converter is operated in a no-load conversion state, and the main power is supplied to the load. If the AC power converter determines the operation state is a second operation state, the DC power converter responds to the control signal and raises the voltage level of the auxiliary power to the working voltage level, such that the auxiliary power replacing the main power is supplied to the load.

In an embodiment of the invention, a power supply method for a power supply apparatus includes following steps: respectively providing a main power and an auxiliary power to a load by a master power converter and a slave power converter, wherein the main power has a working voltage level; determining an operation state of the master power converter; if the operation state is a first operation state, generating the auxiliary power having a voltage level lower than the working voltage level and supplying the main power to the load; if the operation state is a second operation state, raising the voltage level of the auxiliary power to the working voltage level and supplying the auxiliary power to the load in replacement of the main power.

According to an embodiment of the invention, the power supply method further includes: detecting changes of the load; if the load is a heavy load, generating the auxiliary power having the working voltage level, such that the main power and the auxiliary power are both supplied to the load, wherein the master power converter is in the first operation state if the load is the light load; if the master power converter supplies power in an abnormal manner, raising the voltage level of the auxiliary power to the working voltage level, such that the auxiliary power replacing the main power is supplied to the load, wherein the master power converter is in the second operation state if the master power converter supplies the power in the abnormal manner.

According to an embodiment of the invention, the step of detecting the changes to the load includes: detecting an output power of the power supply apparatus; determining whether the output power is less than a predetermined value; if the output power is less than a predetermined value, determining the load is the light load; if the output power is greater than or equal to the predetermined value, determining the load is the heavy load.

According to an embodiment of the invention, the step of supplying the main power and the auxiliary power to the load includes: performing AC-DC conversion on an AC power source to generate the main power and performing DC-DC conversion on a DC power source to generate the auxiliary power.

In view of the above, a power supply apparatus and a power supply method for the power supply apparatus are provided herein. The power supply apparatus is constituted by master-slave power converters; in the normal operation state, the slave power converter may be instructed to operate in the no-load conversion state and may not enter the sleep mode; thereby, if the master power converter becomes dysfunctional and can no longer supply power in a normal manner, the auxiliary power may rapidly replace the main power and may be supplied to the load, thus further stabilizing the power supply to the load.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
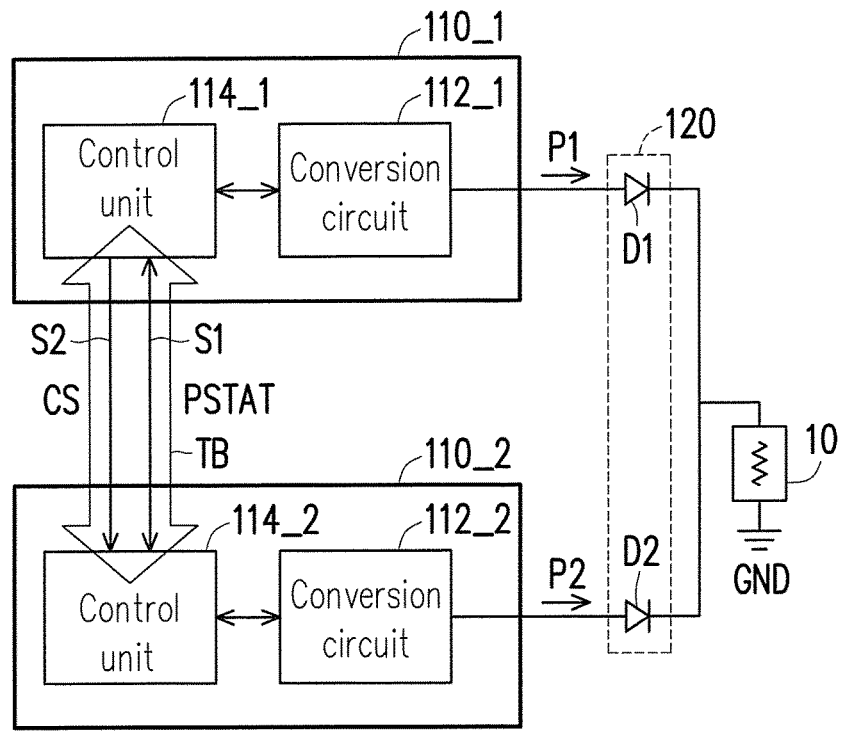
FIG. 1 is a schematic view illustrating a power supply apparatus according to a first embodiment of the invention.

In the field of servers, stabilization is all that matters. According to the normal standard in the industry, the stability of high-end server products reaches 99.99%; that is, if the server runs for one year, the average server crash time frame does not exceed 53 minutes; the stability of mid-level server products reaches 99%, i.e., the average server crash time frame of the mid-level server products is 88 hours; the stability of low-end server products merely reaches 90%, i.e., the average server crash time frame of the low-end server products is up to 876 hours. Since data center server collocation services are often provided with use of the 1 U chassis or the 2 U chassis, meeting the requirement for the stability of the servers, especially the mail servers, web servers, ftp servers, and other servers requiring large capacity, is extremely difficult. Practically, power supply to the server is one of the factors posing an impact on the stability and the security of the server. The power supply to the server must be able to provide stable current, supply high power, respond to different critical working environments, and consistently function for years. The increasing performance of the central processing unit (CPU) leads to increasing power consumption, large storage capacity of hard disks and fast rotational speed; therefore, the power supply faces more and more challenges.

In view of the above, a power supply apparatus and a power supply method thereof are provided herein. The power supply apparatus provided herein is constituted by master-slave power converters, so as to ensure that the power supply to electronic apparatuses, e.g., servers, stays stable, such that the operation stability of the electronic apparatuses may be advanced. In order to make the invention more comprehensible, embodiments are described below as examples to prove that the invention can actually be realized. Moreover, devices/components/steps with same reference numerals represent same or similar parts in the drawings and embodiments.

FIG. 1 is a schematic view illustrating a power supply apparatus according to a first embodiment of the invention. With reference to FIG. 1, the power supply apparatus 100 includes a plurality of power converters and an isolating circuit 120. Here, the power converters are 110_1 and 110_2, for instance, while the invention is not limited thereto. Here, the power supply apparatus 100 is adapted to supply power to a load (e.g., the load 10) in various electronic apparatuses, e.g., a personal computer, a tablet PC, a pocket PC, a notebook computer, a personal digital assistant (PDA), a smart phone, and so on.

The power converters 110_1 and 110_2 respectively supply power P1 and power P2. The isolating circuit 120 is coupled between the output ends of the power converters 110_1 and 110_2 and the load 10, so as to provide the power P1 and the power P2 to the load 10. That is, the power converters 110_1 and 110_2 are coupled to the load 10 in parallel through the isolating circuit 120, so as to supply power to the load 10. The isolating circuit 120 may serve to isolate the power converters 110_1 and 110_2 from each other, so as to prevent the output current of the power converters 110_1 and 110_2 from flowing back to the adjacent power converters 110_1 and 110_2 in a reverse direction. Specifically, the isolating circuit 120 may be implemented by two diodes D1 and D2 arranged at the power converters 110_1 and 110_2 in a forward direction (i.e., the anodes are coupled to the output terminals of the power converters 110_1 and 110_2, and the cathodes are coupled to the load), and thereby the outputs of the two power converters 110_1 and 110_2 may be isolated from each other due to the "forward on/reverse off" characteristics of the diodes. However, note that the structure of the isolating circuit 120 is merely schematic. As a mater of fact, the isolating circuit may be constituted by any electronic device that is subject to the one-way bias and is thus conducted, or the isolating circuit may be directly placed within the power converters 110_1 and 110_2. The invention is not limited thereto.

The power converters 110_1 and 110_2 provided in the present embodiment may be set and designated as a master power converter and a slave power converter, respectively. Here, the way to designate the power converters 110_1 and 110_2 respectively as the master power converter and the slave power converter may include: issuing a designation command through a control end to dynamically/adjustably designate one of the power converters 110_1 and 110_2 as the master power converter or predefining one of the power converters 110_1 and 110_2 as the master power converter. To better describe the invention, the power converter 110_1 is designated as and hereinafter referred to as the master power converter 110_1, and the power converter 110_2 is designated as and hereinafter referred to as the slave power converter 110_2. Besides, the power generated by the master power converter 110_1 is the main power P1, and the power generated by the slave power converter 110_2 is the auxiliary power P2. However, the invention is not limited thereto. The operation of the master power converter 110_1 and the slave power converter 110_2 is further elaborated hereinafter.

According to the present embodiment, the master power converter 110_1 constantly generates the main power P1 having the working voltage level and supplies the main power P1 to the load 10. Besides, according to its own operation state, the master power converter 110_1 provides a corresponding control signal CS to control the slave power converter 110_2. The slave power converter 110_2 responds to the control signal CS and correspondingly adjusts the voltage level of the auxiliary power P2.

In particular, the master power converter 110_1 may determine whether it is operated in a normal manner by detecting whether the voltage/the current output to the load 10 complies with a rated output value or by receiving signals indicating the operation state of the master power converter 110_1 from external circuits (e.g., over-voltage, over-current, over-temperature, or any other protection circuit).

If the master power converter 110_1 determines that it is operated in a normal manner (i.e., the master power converter 110_1 has the normal operation state), the master power converter 110_1 sends an enabling control signal CS (e.g., logic "1") to notify the slave power converter 110_2, such that the slave power converter 110_2 responds to the enabling control signal CS and generates the auxiliary power P2 having the voltage level lower than the working voltage level. Since the voltage level (i.e., the working voltage level) of the main power P1 is higher than the voltage level of the auxiliary power P2, the diode D2 in the isolating circuit 120 responds to the reverse bias and is thus cut off, and thereby the slave power converter 110_2 and the load 10 are electrically insulated from each other. As a result, the slave power converter 110_2 does not generate the output current, even though the slave power converter 110_2 still performs power conversion. That is, if the master power converter 110_1 has the normal operation state, the isolating circuit 120 electrically disconnects the load 10 and the slave power converter 110_2, such that the slave power converter 110_2 is operated in the no-load conversion state, and the power required by the load 10 is solely supplied by the master power converter 110_1.

If the master power converter 110_1 determines that it is operated in an abnormal manner, the master power converter 110_1 sends a disabling control signal CS (e.g., logic "0") to notify the slave power converter 110_2, such that the slave power converter 110_2 responds to the disabling control signal CS and raises the voltage level of the auxiliary power P2 to the working voltage level. When the voltage level of the auxiliary power P2 is raised to the working voltage level, the diode D1 in the isolating circuit 120 responds to the reverse bias and is thus cut off, and thereby the master power converter 110_1 and the load 10 are electrically insulated from each other. By contrast, the diode D2 in the isolating circuit 120 responds to the forward bias resulting from the auxiliary power P2 and is thus conducted. Namely, the auxiliary power P2 replaces the main power P1 and supplies power to the load 10.

In light of the foregoing, the power conversion apparatus 100 described herein allows the slave power converter 110_2 to be operated in the no-load conversion state and not to enter the sleep mode if the master power converter 110_1 is in the normal operation state. Once the master power converter 110_1 supplies power in an abnormal manner, it is no necessary to awake the slave power converter 110_2 from the sleep mode; instead, the voltage level of the auxiliary power P2 generated by the slave power converter 110_2 is raised to the working voltage level, such that the slave power converter 110_2 immediately replaces/fills in for the master power converter 110_1 and supplies power to the load 10. Thereby, the power supply to the load 10 is not terminated by the overly long time of awakening the slave power converter 110_2.

According to an embodiment of the invention, the master power converter 110_1 in the normal operation state may further achieve high conversion efficiency to supply power by detecting changes of the load 10 to correspondingly adjust the voltage level of the auxiliary power P2.

Specifically, the master power converter 110_1 in the normal operation state may detect the magnitude or the value of the output power of the load 10 and further determine whether the load 10 is a light load or a heavy load. If the master power converter 110_1 determines the load 10 is the heavy load, the master power converter 110_1 issues a corresponding control signal CS, such that the slave power converter 110_2 responds to the control signal CS and generates the auxiliary power P2 having the working voltage level. That is, if the load 10 is the heavy load, the main power P1 and the auxiliary power P2 are both supplied to the load 10.

If the master power converter 110_1 determines the load 10 is the light load, the master power converter 110_1 issues a corresponding control signal CS, such that the slave power converter 110_2 responds to the control signal CS and generates the auxiliary power P2 having the voltage level lower than the working voltage level. That is, if the load 10 is the light load, the main power P1 is solely supplied to the load 10, and the slave power converter 110_2 is isolated by the isolating circuit 120 and enters the no-load conversion mode.

Here, the specific way to determine the changes to the load 10 may include detecting the output power of the power supply apparatus 100 by the master power converter 110_1 and thereby determining whether the output power of the power supply apparatus 100 is less than a predetermined value. The actual value of the predetermined value may be determined by the actual requirement, e.g., 20% of the rated output power. If the output power detected by the master power converter 110_1 is less than the predetermined value, the master power converter 110_1 determines the load 10 is the light load; by contrast, if the output power detected by the master power converter 110_1 is greater than or equal to the predetermined value, the master power converter 110_1 determines the load 10 is the heavy load. However, the invention is not limited thereto.

As such, the power supply apparatus 100 is able to dynamically supplying power to the load 10 with use of one or more power converters 110_1 and 110_2 according to whether the light 10 is the light load or the heavy load, such that the conversion efficiency of the power converters 110_1 and 110_2 can be optimized.

Figure 2:
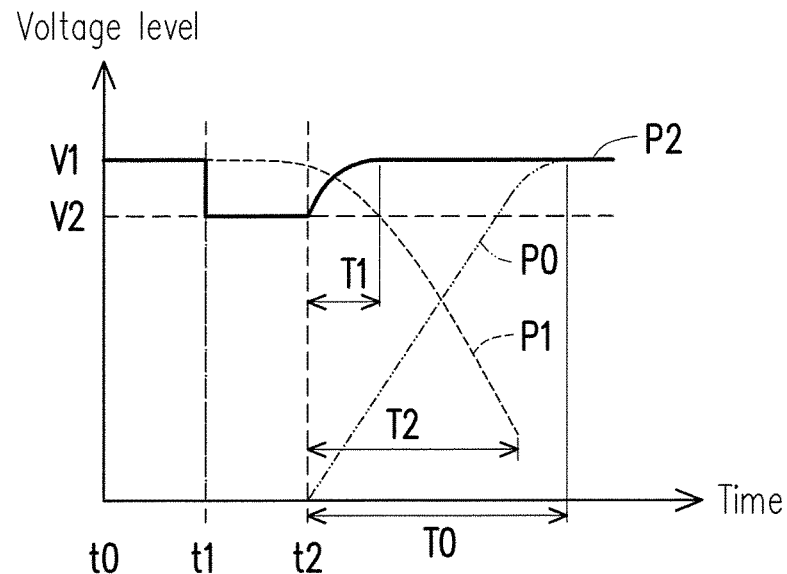
FIG. 2 is a power timing chart according to the embodiment shown in FIG. 1.

The power timing chart of FIG. 2 illustrates how the power supply apparatus 100 described in the embodiment and shown in FIG. 1 supplies power. Here, FIG. 2 is a power timing chart according to the embodiment shown in FIG. 1.

With reference to FIG. 1 and FIG. 2, in the present embodiment, from the time t0 to the time t1, the master power converter 110_1 determines that the load 10 is the heavy load, and therefore the master power converter 110_1 issues the corresponding control signal CS during this period/duration, such that the master power converter 110_1 and the slave power converter 110_2 respectively output the main power P1 and the auxiliary power P2 both having the working voltage level V1 (e.g., 12V). At this time, in the power supply apparatus 100, the main power P1 generated by the master power converter 110_1 and the auxiliary power P2 generated by the slave power converter 110_2 are both supplied to the load 10.

From the time t1 to the time t2, the master power converter 110_1 determines that the load 10 is changed from the heavy load to the light load, and therefore the master power converter 110_1 issues the corresponding control signal CS during this period, such that the voltage level of the auxiliary power P2 is reduced from the working voltage level V1 to a standby voltage level V2 (e.g., 11V); at this time, the master power converter 110_1 still generates the main power P1 having the working voltage level V1 and supplies the main power P1 to the load 10. That is, in the power supply apparatus 100, the main power P1 generated by the master power converter 110_1 is solely supplied to the load 10, while the slave power converter 110_2 is isolated by the isolating circuit 120 and enters the no-load conversion mode.

At the time t2, if the master power converter 110_1 determines that it becomes dysfunctional and can no longer supply power in a normal manner, the master power converter 110_1 issues the corresponding control signal CS, such that the voltage level of the auxiliary power P2 is raised from the standby voltage level V2 to the working voltage level V1.

As shown in FIG. 2, compared to the conventional activation mechanism for the conventional auxiliary power P0, the time frame T1 during which the voltage level of the auxiliary power P2 is raised from the standby voltage level V2 to the working voltage level V1 (i.e., the time frame during which the auxiliary power P2 replaces the main power P1 and becomes the main power supply to the load) is much shorter than the time frame T0 during which the conventional activation mechanism for the conventional auxiliary power P0. To be specific, the time frame T1 is shorter than the time frame T2 during which the master power converter 110_1 detects its abnormal operation state and completely stops supply power to the load; therefore, when the master power converter 110_1 detects its abnormal operation state, the power may be rapidly supplied to the load 10 by the slave power converter 110_2, and the temporary termination of power supply may be prevented.

Note that the power timing chart of FIG. 2 is merely exemplary. In other embodiments, no matter whether the load is the light load or the heavy load, the master power converter 110_1 in the normal operation state may supply power to the load 10, while the slave power converter 110_2 in the normal state stays in the no-load conversion state, which should however not be construed as a limitation to the invention.

After the embodiment regarding how the power supply apparatus 100 described in the embodiment and shown in FIG. 1 supplies power is provided above, the detailed circuitry of each of the power converters 110_1 and 110_2 are explained below.

With reference to FIG. 1, in the present embodiment, the master power converter 110_1 may include a conversion circuit 112_1 and a control unit 114_1, and the slave power converters 110_2 may include a conversion circuit 112_2 and a control unit 114_2.

The conversion circuits 112_1 and 112_2 serve to perform power conversion and thereby respectively generate the main power P1 and the auxiliary power P2. Practically, the type of topology of the conversion circuits 112_1 and 112_2 may include a forward power conversion circuit, a flyback power conversion circuit, an active clamp and half bridge power conversion circuit, an active clamp and full bridge power conversion circuit, and a push-pull power conversion circuit, which should however not be construed as limitations to the invention. The structures and the operational manner of the aforesaid power conversion circuits are well known to people having ordinary skill in the pertinent art and thus will not be further described herein.

The control units 114_1 and 114_2 respectively serve to control power conversion of the conversion circuits 112_1 and 112_2. For instance, the control units 114_1 and 114_2 may provide switch signals with pulse width modulation (PWM) form to control the power switches (not shown) of the conversion circuits 112_1 and 112_2, such that the power switches may be switched on or off to charge or discharge the resonance elements (not shown) of the conversion circuits 112_1 and 112_2, and thus the conversion circuits 112_1 and 112_2 are able to output power in a stable manner. By adjusting the duty cycles of the switch signals, the control units 114_1 and 114_2 are able to change the voltage value/the current amount of the main power P1 and the auxiliary power P2 respectively output by the conversion circuits 112_1 and 112_2. The control units 114_1 and 114_2 may further detect the output states of the conversion circuits 112_1 and 112_2 through the specific configuration of the feedback circuit; according to the obtained output states, the control units 114_1 and 114_2 then perform certain control mechanism.

According to the present embodiment, the control units 114_1 and 114_2 may exchange/transmit circuit operation information (e.g., the control signal CS and the power state information associated with the output states of the conversion circuits conversion circuits 112_1 and 112_2) through a transmission channel TB, so as to achieve the master-slave control mechanism.

Specifically, the transmission channel TB may include two signal lines S1 and S2 coupled between the control units 114_1 and 114_2. The control units 114_1 and 114_2 may share the power state information PSTAT through the signal line S1, and the control signal CS may be transmitted through the signal line S2. According to the power state information PSTAT obtained through the signal line S1, the control unit 114_1 is able to determine the operation state of the power converter 110_1; through the signal line S2, the control unit 114_1 can issue the control signal CS to modulate/regulate the output of the power converter 110_2.

It should be mentioned that the transmission channel TB including the two signal lines S1 and S2 is merely an exemplary embodiment of the invention. Practically, the control signal CS and the power state information PSTAT may be serially transmitted via one signal line, and the invention is not limited thereto.

Besides, each of the power converters 110_1 and 110_2 provided in the present embodiment may have substantially the same structure and function. The difference in power supply behaviors of the two power converters 110_1 and 110_2 lies in the designation of the master power converter and the slave power converter. That is, if the power converter 110_2 is designated as the master power converter, the power converter 110_2 is capable of performing all functions performed by the power converter 110_1 as described above.

Figure 3:
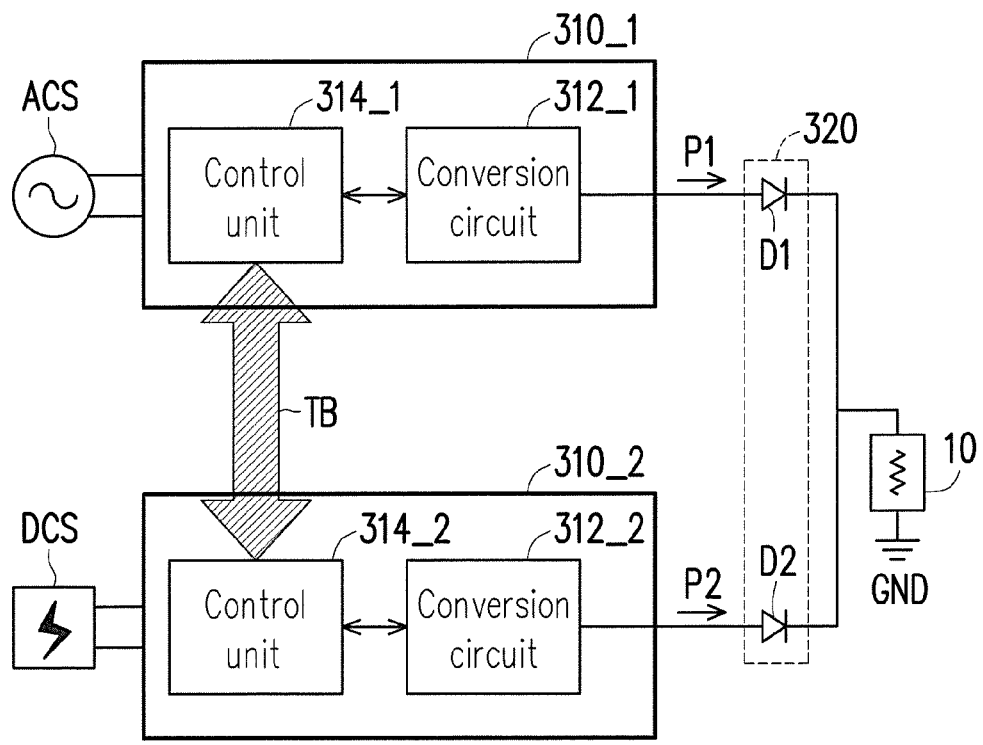
FIG. 3 is a schematic view illustrating a power supply apparatus according to a second embodiment of the invention.

FIG. 3 is a schematic view illustrating a power supply apparatus according to a second embodiment of the invention. With reference to FIG. 3, the power supply apparatus 300 includes an AC power converter 310_1, a DC power converter 310_2, and an isolating circuit 320. The AC power converter 310_1 includes an AC-DC conversion circuit 312_1 and a control unit 314_1. The DC power converter 310_2 includes a DC-DC conversion circuit 312_2 and a control unit 314_2.

In the present embodiment, the AC power converter 310_1 is designated as the master power converter, while the DC power converter 310_2 is designated as the slave power converter. The AC power converter 310_1 performs AC-DC conversion on an AC power source ACS (e.g., commercial power), so as to generate the main power P1 having a working voltage level. The DC power converter 310_2 is configured to perform DC-DC conversion on a DC power source DCS (e.g., a battery), so as to generate the auxiliary power P2.

Particularly, the structure and the operation manner of the power supply apparatus 300 provided in the present embodiment are similar to those of the power supply apparatus 100 provided in the embodiment and shown in FIG. 1. The difference therebetween lies in that the rapid switch to the auxiliary power P2 to supply power, as provided in the previous embodiments, may be applied in the power supply apparatus 300 using the AC power source ACS and the DC power source DCS, so as to achieve uninterruptable power supply (UPS).

Figure 4:
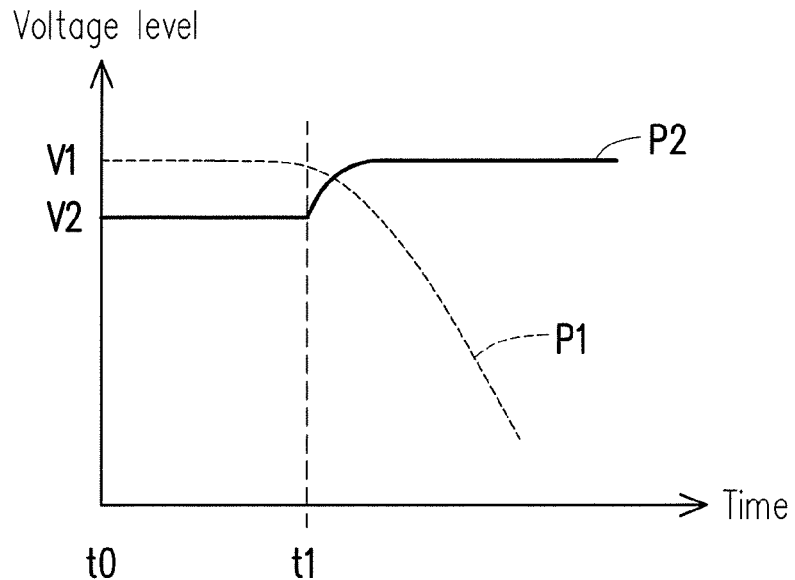
FIG. 4 is a power timing chart according to the embodiment shown in FIG. 3.

The power timing chart of FIG. 4 illustrates how the power supply apparatus 300 supplies power. Here, FIG. 4 is a power timing chart according to the embodiment shown in FIG. 3.

With reference to FIG. 3 and FIG. 4, similar to the embodiment shown in FIG. 1, the embodiment given herein allows the AC power converter 310_1 to provide the DC power converter 310_2 with the control signal in response to its operation state (through the transmission channel TB), so as to determine whether the DC power converter 310_2 is operated in a power supply state (and supplies the auxiliary power P2 having the working voltage level) or a no-load conversion state.

As shown in FIG. 4, from the time t0 to the time t1, the AC power converter 310_1 (i.e., the master power converter) determines that the AC power converter 310_1 is in the normal operation state, and therefore the AC power converter 310_1 issues the corresponding control signal CS during this period/duration, such that the AC power converter 310_1 converts the AC power source ACS into the main power P1 in form of the DC power, and the main power P1 has the working voltage level V1 (e.g., 12V). Through the isolating circuit 320, the main power P1 is provided to the load 10. In response to the control signal issued by the AC power converter 310_1, the DC power converter 310_2 generates the auxiliary power P2 having the standby voltage level V2; thereby, the diode D2 in the isolating circuit 320 is cut off due to the voltage difference between the working voltage level V1 and the standby voltage level V2, and the DC power converter 310_2 is isolated by the isolating circuit 320 and stays in the no-load conversion state. That is, given that the AC power source ACS supplies power in a normal manner, and that the AC power converter 310_1 is operated in the normal operation state, the power supply apparatus 300 solely supplies the main power P1 (generated by the AC power converter 310_1) to the load 10.

At the time t1, if the AC power converter 310_1 determines that it becomes dysfunctional and can no longer supply power in a normal manner, the AC power converter 310_1 issues the corresponding control signal CS, such that the DC power converter 310_2 raises the voltage level of the auxiliary power P2 from the standby voltage level V2 to the working voltage level V1. When the voltage level of the auxiliary power P2 is raised to the working voltage level V1, the diode D1 in the isolating circuit 320 responds to the reverse bias and is thus cut off, and thereby the AC (master) power converter 310_1 and the load 10 are electrically insulated from each other. By contrast, the diode D2 in the isolating circuit 320 responds to the forward bias resulting from the auxiliary power P2 and is thus conducted. Namely, the auxiliary power P2 replaces the main power P1 and supplies power to the load 10.

Thereby, if the AC power source ACS stops supplying power, the power supply apparatus 300 is able to timely provide the auxiliary power P2 generated by the DC power source DCS to the load 10, so as to achieve the UPS and allow the load 10 to be operated in a normal manner.

Other possible manners to implement the power supply apparatus and other way to supply power are described in the following third and fourth embodiments, as shown in FIG. 5 to FIG. 10. To clearly illustrate the invention, the structure of each power converter is briefly depicted in FIG. 5 and FIG. 9. The detailed structure and the specific descriptions of each power converter may be found in the previous first and second embodiments.

Figure 5:
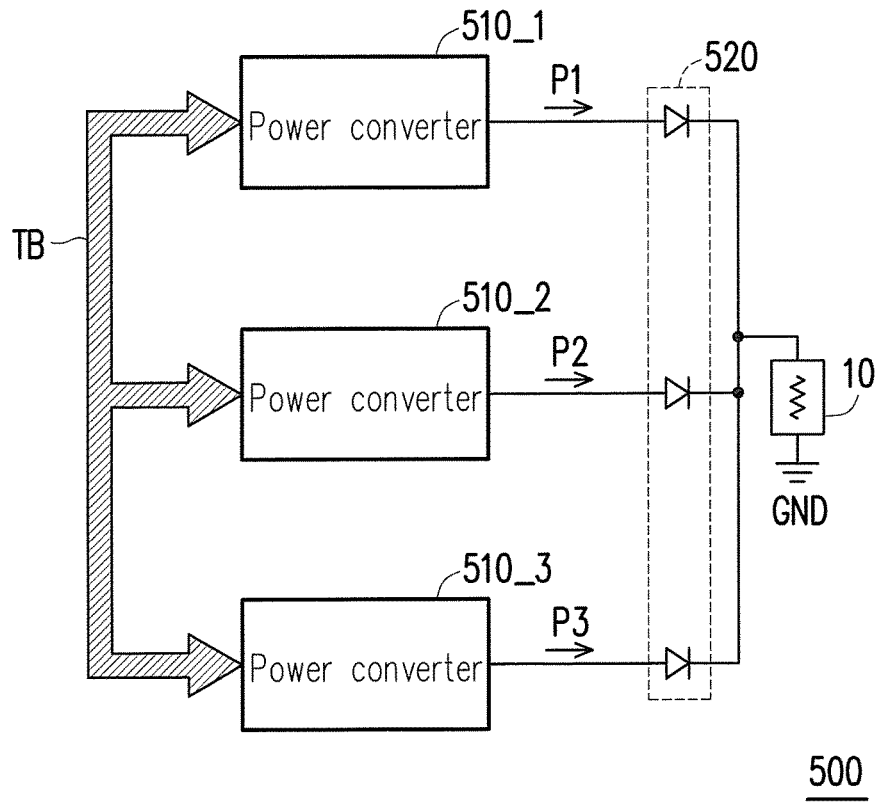
FIG. 5 is a schematic view illustrating a power supply apparatus according to a third embodiment of the invention.
Figure 7:
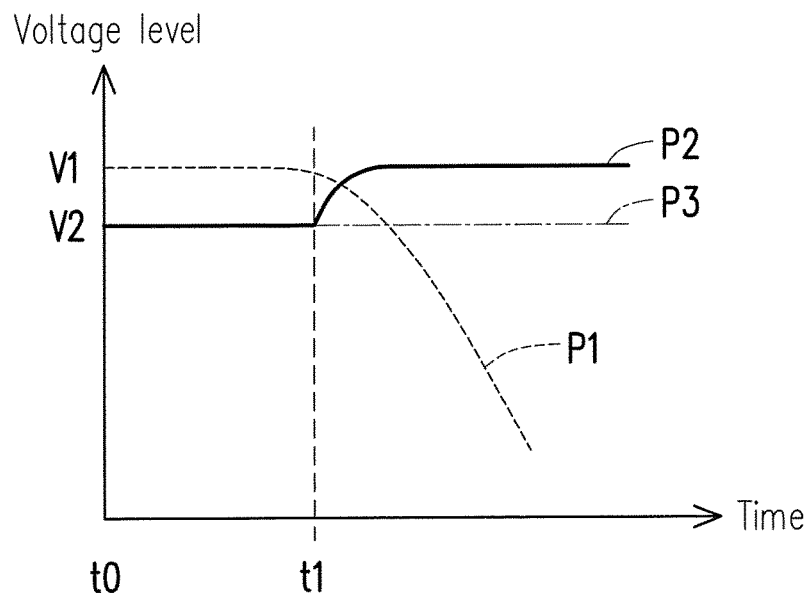
Figure 8:
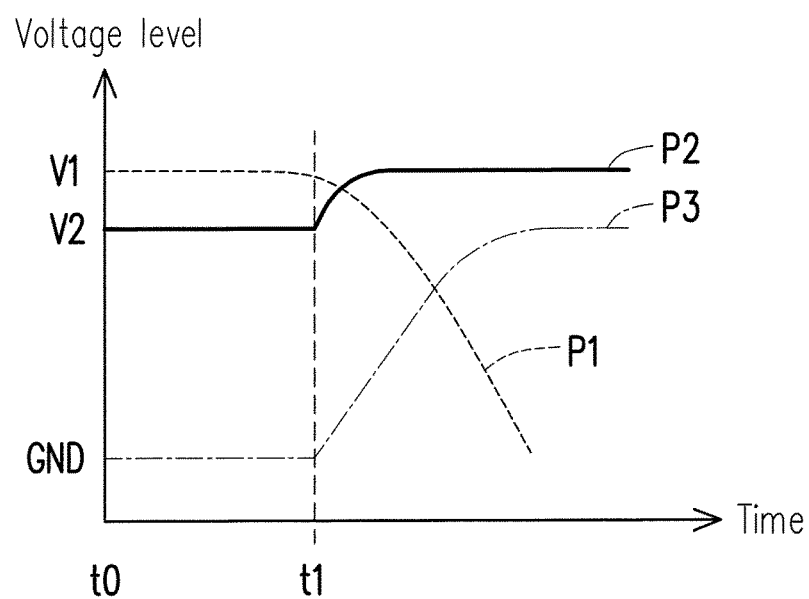

FIG. 5 is a schematic view illustrating a power supply apparatus according to a third embodiment of the invention. With reference to FIG. 5, in the present embodiment, the power supply apparatus 500 includes power converters 510_1 to 510_3 and an isolating circuit 520. Under the circumstances, one of the power converters 510_1 to 510_3 may be designated as the master power converter based on the actual requirement, and the other two power converters may be designated as the slave/auxiliary power converters with different power supply mechanisms. Here, the power converter 510_1 is designated as the master power converter, the power converter 510_2 is designated as the first slave/auxiliary power converter, and the power converter 510_3 is designated as the second slave/auxiliary power converter, so as to describe three different ways to supply power, as shown in FIG. 6 to FIG. 8; however, the invention is not limited thereto.

Figure 6:
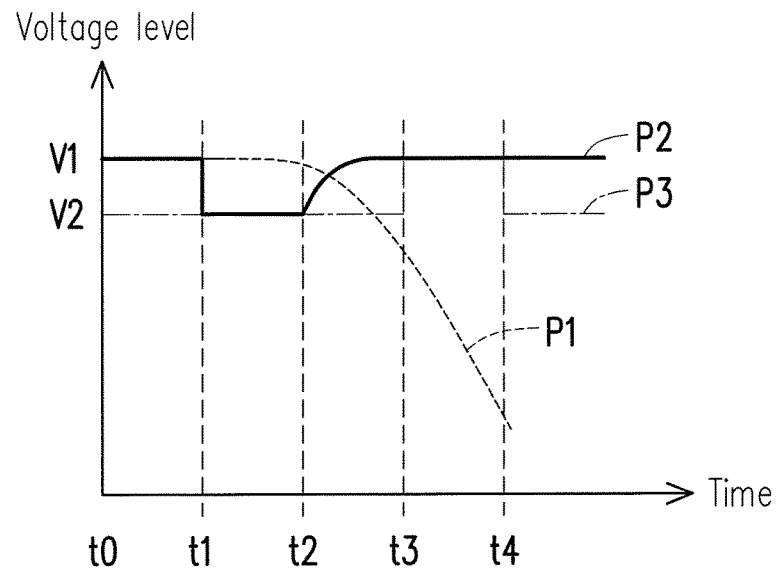
FIG. 6 to FIG. 8 are power timing charts illustrating different embodiments of the power supply apparatus shown in FIG. 5.

With reference to FIG. 5 and FIG. 6, in the present embodiment, the master power converter 510_1 in the normal operation state detects changes to the load 10. If the master power converter 510_1 determines the load 10 is the heavy load (e.g., from the time t0 to the time t1), the master power converter 510_1 issues a control signal through TB, so as to control the first slave power converter 510_2 to generate the auxiliary power P2 having the working voltage level V1. The master power converter 510_1 also issues a control signal through TB to control the second slave power converter 510_3 to generate the auxiliary power P3 having the standby voltage level V2, such that the second slave power converter 510_3 is isolated by the isolating circuit 520 and stays in the no-load conversion state.

If the master power converter 510_1 determines the load 10 is changed from the heavy load to the light load (e.g., from the time t1 to the time t2), the master power converter 510_1 controls the first slave power converter 510_2 to reduce the voltage level of the auxiliary power P2 to the standby voltage level V2 and controls the second slave power converter 510_3 to constantly generate the auxiliary power P3 having the standby voltage level V2.

If the master power converter 510_1 determines that it becomes dysfunctional (e.g., after the time t2), the master power converter 510_1 controls the first slave power converter 510_2 to raise the voltage level of the auxiliary power P2 from the standby voltage level V2 to the working voltage level V1.

In addition, after the power converter 510_2 completely replaces the power converter 510_1 and supplies power to the load 10, the power converter 510_2 is designated as the master power converter, and the power converter 510_3 is designated as the first slave power converter.

Therefore, after the power converter 510_1 becomes dysfunctional/can no longer supply power, the master power converter 510_2 issues a control signal through TB to control the first slave power converter 510_3 to generate the auxiliary power P3 having the working voltage level V1 if the master power converter 510_2 determines the load 10 is changed from the light load to the heavy load (e.g., from the time t3 to the time t4). Besides, if the master power converter 510_2 determines the load 10 is changed from the heavy load to the light load (e.g., after the time t4), the master power converter 510_2 issues a control signal through TB to control the first slave power converter 510_3 to reduce the voltage level of the auxiliary power P3 to the standby voltage level V2.

That is, after the power converter 510_1 becomes dysfunctional, the power converter 510_2 replaces the power converter 510_1 and becomes the master power converter to supply power in the same manner as the functional power converter 510_1 used to do (before the power converter 510_1 becomes dysfunctional), and the power converter 510_3 replaces the power converter 510_2 and becomes the first slave power converter to supply power in the same manner as the power converter 510_2 used to do (before the power converter 510_1 becomes dysfunctional).

With reference to FIG. 5 and FIG. 7, the embodiment provided herein is similar to the embodiment shown in FIG. 6. The difference therebetween lies in that the first slave power converter 510_2 does not adjust the voltage level of the auxiliary power P2 in response to the changes to the load 10. Namely, in the present embodiment, as long as the master power converter 510_1 is operated in the normal operation state (e.g., from the time t0 to the time t1), the power supply apparatus 500 solely supplies the main power P1 (generated by the master power converter 510_1) to the load 10.

Once the master power converter 510_1 can no longer supply power in the normal manner, the first slave power converter 510_2 responds to the received control signal and raises the voltage level of the auxiliary power P2 from the standby voltage level V2 to the working voltage level V1. After the power to the load 10 is completely supplied by the power converter 510_2, the power converter 510_2 replaces the power converter 510_1 and becomes the master power converter to supply power as the functional power converter 510_1 used to do (before the power converter 510_1 becomes dysfunctional); similarly, the power converter 510_3 replaces the power converter 510_2 and becomes the slave power converter to supply power as the power converter 510_2 used to do (before the power converter 510_1 becomes dysfunctional). Other similar or repetitive descriptions will not be further provided hereinafter.

With reference to FIG. 5 and FIG. 8, the embodiment provided herein is similar to the embodiment shown in FIG. 7. The difference therebetween lies in that the second slave power converter 510_3 described in the present embodiment is preset to be operated in a sleep mode before the master power converter 510_1 becomes dysfunctional, i.e., no power conversion is performed herein, and the ground potential GND is output.

Once the master power converter 510_1 can no longer supply power in the normal manner, the first slave power converter 510_2 responds to the received control signal and raises the voltage level of the auxiliary power P2 from the standby voltage level V2 to the working voltage level V1, and the second slave power converter 510_3 responds to the control signal and is awaken from the sleep mode to generate the auxiliary power P3 having the standby voltage level V2. After the power to the load 10 is completely supplied by the power converter 510_2, the power converter 510_2 replaces the power converter 510_1 and becomes the master power converter to supply power as the functional power converter 510_1 used to do (before the power converter 510_1 becomes dysfunctional); similarly, the power converter 510_3 replaces the power converter 510_2 and becomes the first slave power converter to supply power as the power converter 510_2 used to do (before the power converter 510_1 becomes dysfunctional). Other similar or repetitive descriptions will not be further provided hereinafter.

Figure 9:
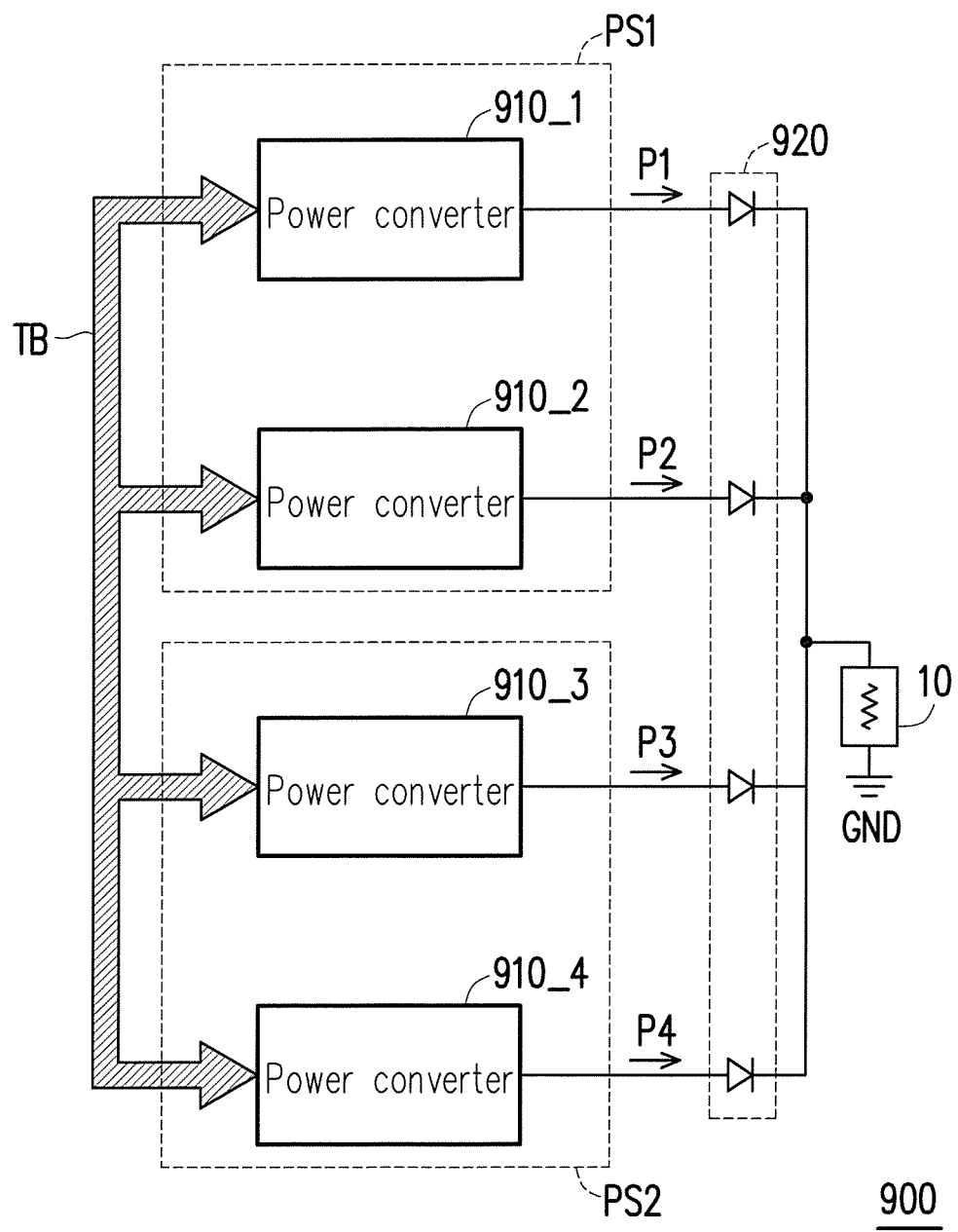
FIG. 9 is a schematic view illustrating a power supply apparatus according to a fourth embodiment of the invention.

FIG. 9 is a schematic view illustrating a power supply apparatus according to a fourth embodiment of the invention. With reference to FIG. 9, in the present embodiment, the power supply apparatus 900 includes power converters 910_1 to 910_4 and an isolating circuit 920. Under the circumstances, two of the power converters 910_1 to 910_4 may be designated as the master power conversion group based on the actual requirement and the other two power converters may be designated as the slave power conversion group. Here, the power converters in the same power conversion group supply power in the same manner.

Figure 10:
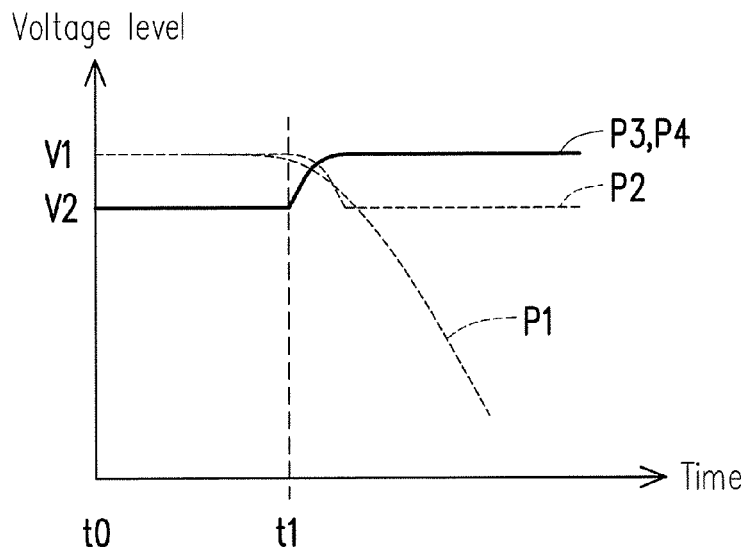
FIG. 10 is a power timing chart according to the embodiment shown in FIG. 9.

The power conversion group containing the power converters 910_1 and 910_2 is pre-defined as the master power conversion group PS1 (i.e., the power converters 910_1 and 910_2 are designated as the master power converters), and the power conversion group containing the power converters 910_3 and 910_4 is pre-defined as the slave power conversion group PS2 (i.e., the power converters 910_3 and 910_4 are designated as the slave power converters), so as to illustrate the embodiment shown in FIG. 10; however, the invention is not limited thereto.

With reference to FIG. 9 and FIG. 10, in the present embodiment, if the master power conversion group PS1 (e.g., one of the power converters 910_1 and 910_2) determines that it is in the normal operation state (e.g., from the time t0 to the time t1), the power converters 910_1 and 910_2 respectively generate the main power P1 and the main power P2, each of which has the working voltage level V1. The master power conversion group PS1 (e.g., one of the power converters 910_1 and 910_2) issues the corresponding control signal CS during this period, so as to control the slave power converters 910_3 and 910_4 in the slave power conversion group PS2 to respectively generate the auxiliary power P3 and the auxiliary power P4, each of which has the standby voltage level V2. Thereby, the slave power conversion group PS2 is operated in the no-load conversion state. That is, the master power converters 910_1 and 910_2 in the master power conversion group PS1 are both operated in the normal operation state, and in this case the power supply apparatus 900 supplies the main power P1 generated by the master power converter 910_1 and main power P2 generated by the master power converter 910_2 to the load 10.

By contrast, once either of the master power converters 910_1 and 910_2 in the master power conversion group PS1 can no longer supply power in the normal manner (e.g., the master power converter 910_1 exemplarily becomes dysfunctional, while the master power converter 910_2 may become dysfunctional as well), the slave power converters 910_3 and 910_4 in the slave power conversion group PS2 respond to the received control signals and raise the voltage level of the auxiliary power P3 and the voltage level of the auxiliary power P4 from the standby voltage level V2 to the working voltage level V1, such that the slave power conversion group PS2 replaces the master power conversion group PS1 and supplies power to the load 10. After the power to the load is completely supplied by the power conversion group PS2, the power conversion group PS2 replaces the power conversion group PS1 and becomes the master power conversion group PS1 to supply power in the same manner as the power conversion group PS1 used to do (before the power converter 910_1 becomes dysfunctional). The functional power converter 910_2 in the power conversion group PS1 is then designated as the slave power converter and supplies power in the same manner as the power converter 910_3/910_4 used to do (before the power converter 910_1 becomes dysfunctional).

Thereby, as long as any of the power converters 910_3 and 910_4 becomes dysfunctional, the power converter 910_2 may replace the dysfunctional power converter 910_3/910_4 and become the master power converter.

The power supply apparatus 900 provided in the present embodiment, even not shown in FIG. 10, can also detect changes to the load 10 while the power supply apparatus 900 is in the normal operation state (i.e., the four power converters 910_1 to 910_4 can all supply power in the normal manner); according to whether the load 10 is the light load or the heavy load, the power supply apparatus 900 may determine whether the power to the load 10 is solely supplied by the power conversion group PS1 (i.e., by the power P1 generated by the power converter 910_1 and the power P2 generated by the power converter 910_2) or by both of the power conversion groups PS1 and PS2 (i.e., by the power P1 to P4 generated by the power converters 910_1 to 910_4). Such manner to supply power is similar to that provided in the embodiment shown in FIG. 2, and the invention is not limited thereto.

Besides, the above-mentioned power supply apparatuses may respectively have two, three, and four power converters, for instance, which should however not be construed as limitations to the invention. With reference to said embodiments, people having ordinary skill in the art should be able to equip the power supply apparatus with five or more power converters to supply power to the load in a manner similar to any of those provided above. That is, when the power supply apparatus is in the normal operation state, as long as at least one power converter in the power supply apparatus is operated in the no-load conversion state and does not enter the sleep mode, such power converter may be rapidly switched to the normal state to supply power to the load while the master power converter becomes dysfunctional, which falls within the scope of protection of the invention.

Figure 11:
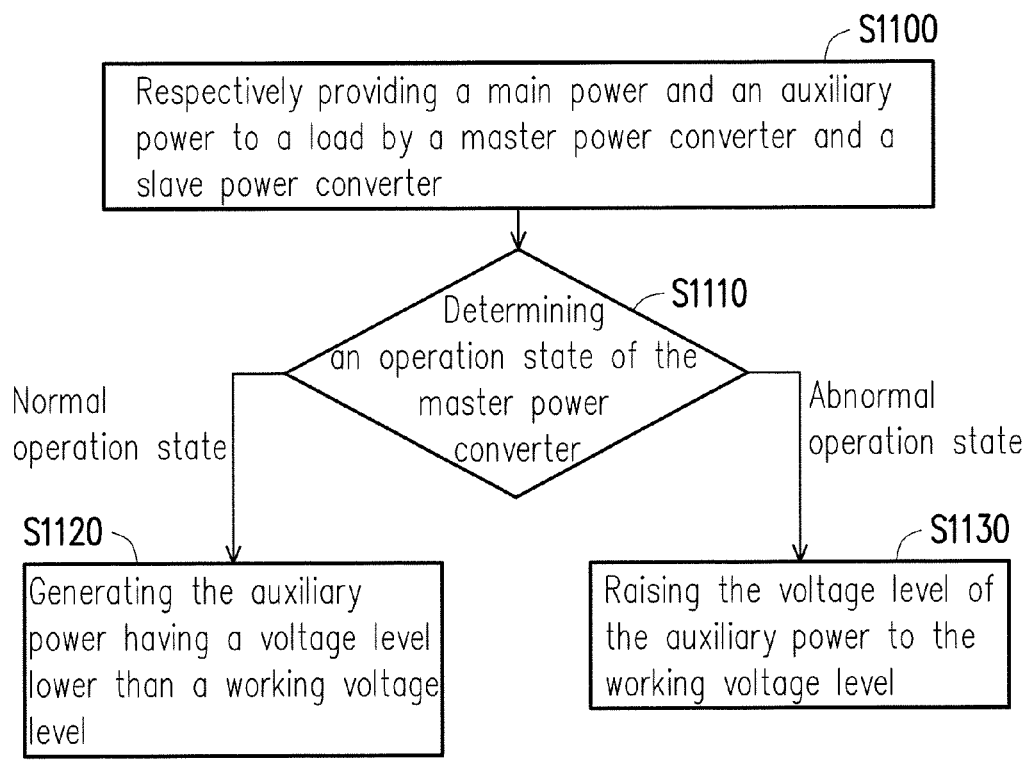
FIG. 11 is a flowchart illustrating a power supply method according to an embodiment of the invention.

FIG. 11 is a flowchart illustrating a power supply method according to an embodiment of the invention. The power supply method described in the present embodiment is applicable to the power supply apparatus 100, 300, 500, or 900 respectively shown in FIG. 1, FIG. 3, FIG. 5, or FIG. 9, while the invention is not limited thereto.

With reference to FIG. 11, the power supply method provided herein includes following steps: respectively providing a main power and an auxiliary power to a load (e.g., the load 10) by a master power converter and a slave power converter (in step S1100), wherein the main power has a working voltage level; determining an operation state of the master power converter (in step S1110); if the operation state of the master power converter is a normal operation state, generating auxiliary power having a voltage level lower than the working voltage level and supplying the main power to the load (in step S1120); and if the operation state is an abnormal operation state, raising the voltage level of the auxiliary power to the working voltage level and supplying the auxiliary power to the load in replacement of the main power (in step S1130).

Figure 12:
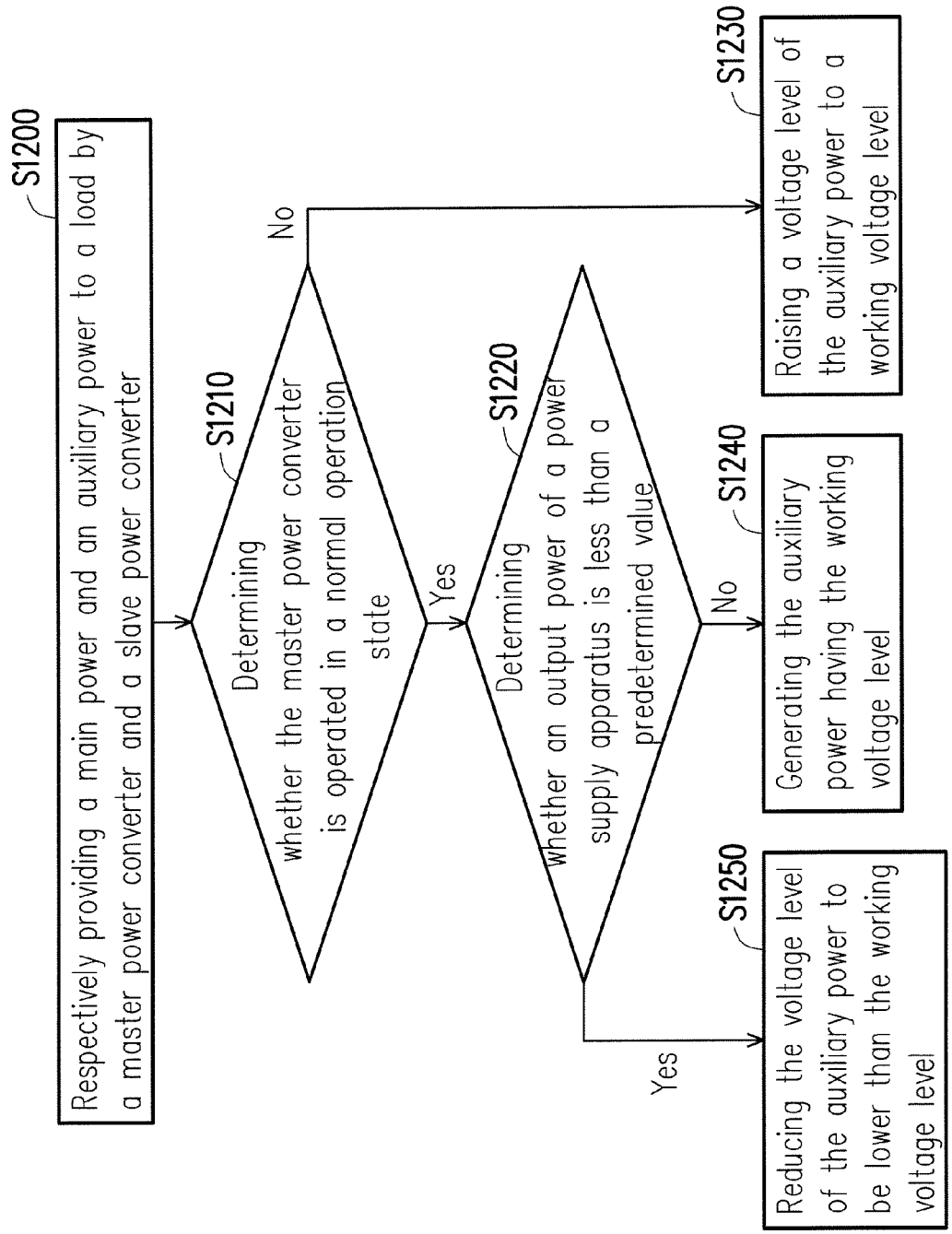
FIG. 12 is a flowchart illustrating a power supply method according to another embodiment of the invention.
Figure 13:
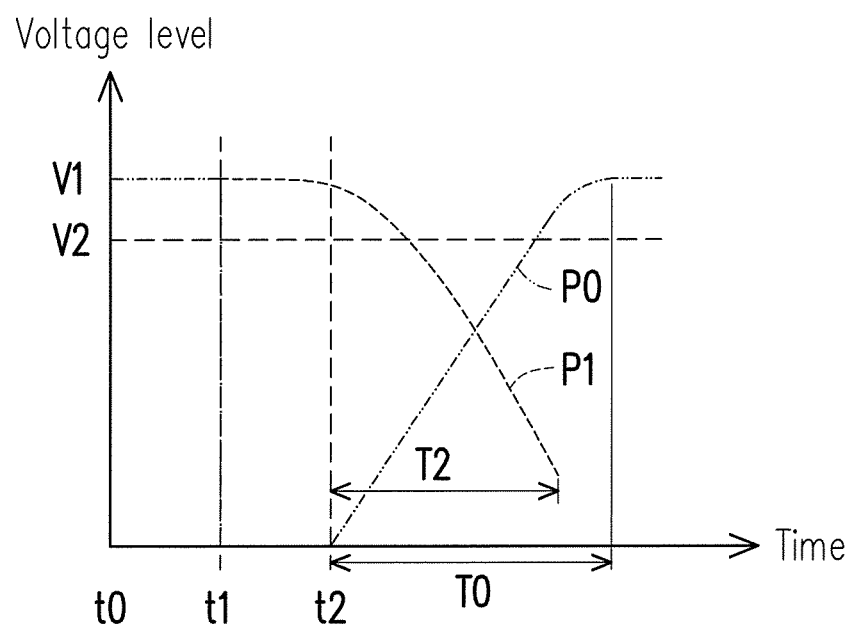
FIG. 13 is timing chart of activating conventional auxiliary power.

FIG. 12 is a flowchart illustrating a power supply method according to another embodiment of the invention. The power supply method described in the present embodiment is also applicable to the power supply apparatus 100, 300, 500, or 900 respectively shown in FIG. 1, FIG. 3, FIG. 5, or FIG. 9, while the invention is not limited thereto.

With reference to FIG. 12, a power supply method provided in the present embodiment includes following steps: respectively providing a main power and an auxiliary power to a load (e.g., the load 10) by a master power converter and a slave power converter (in step S1200); determining whether the master power converter is operated in a normal operation state (step S1210); if yes, further determining whether an output power of the power supply apparatus is less than a predetermined value (in step S1220); and if no, raising the voltage level of the auxiliary power to the working voltage level and supplying the auxiliary power to the load in replacement of the main power (in step S1230).

In step S1220, if the output power of the power supply apparatus is greater than or equal to the predetermined value, the load is determined to be the heavy load, and the auxiliary power having the working voltage level is accordingly generated, such that both the main power and the auxiliary power are supplied to the load (in step S1240); and if the output power of the power supply apparatus is less than the predetermined value, the load is determined to be the light load, and the voltage level of the auxiliary power is accordingly reduced to be lower than the working voltage level (in step S1250).

Sufficient written support and teachings of the power supply methods depicted in FIG. 11 and FIG. 12 may be found in the above descriptions illustrated in FIG. 1 to FIG. 10, and thus similar or repetitive descriptions are not further provided hereinafter.

To sum up, a power supply apparatus and a power supply method thereof are provided herein. The power supply apparatus is constituted by master-slave power converters; in the normal operation state, the slave power converter may be instructed to operate in the no-load conversion state and may not enter the sleep mode; thereby, if the master power converter becomes dysfunctional and can no longer supply power in a normal manner, the auxiliary power may rapidly replace the main power and may be supplied to the load, thus further stabilizing the power supply to the load.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A power supply apparatus comprising:
   a master power converter configured to generate a main power having a working voltage level; and
   a slave power converter configured to generate an auxiliary power, wherein the master power converter and the slave power converter are adapted to be coupled to a load in parallel,
   wherein the master power converter provides a control signal to the slave power converter in response to an operation state of the master power converter,
   if the master power converter determines the operation state is a first operation state, the slave power converter responds to the control signal and performs power conversion to generate the auxiliary power having a voltage level higher than zero but lower than the working voltage level, such that the slave power converter does not generate an output current to the load even though the slave power converter still performs power conversion, and the main power is supplied to the load, and
   if the master power converter determines the operation state is a second operation state, the slave power converter responds to the control signal and raises the voltage level of the auxiliary power to the working voltage level, such that the auxiliary power replacing the main power is supplied to the load.

2. The power supply apparatus as recited in claim 1, wherein the master power converter detects changes of the load for determining the operation state of the master power converter and accordingly providing the corresponding control signal to adjust the voltage level of the auxiliary power.

3. The power supply apparatus as recited in claim 2, wherein the master power converter determines whether an output power of the power supply apparatus is less than a predetermined value, if the output power is less than the predetermined value, the master power converter determines the load is a light load, and if the output power is greater than or equal to the predetermined value, the master power converter determines the load is a heavy load.

4. The power supply apparatus as recited in claim 3, wherein
   if the load is the heavy load, the slave power converter responds to the control signal and generates the auxiliary power having the working voltage level, such that the main power and the auxiliary power are both supplied to the load,
   if the load is the light load, the operation state of the master power converter is the first operation state, and the slave power converter responds to the control signal and reduces the voltage level of the auxiliary power to be higher than zero but lower than the working voltage level, such that the slave power converter does not generate the output current to the load even though the slave power converter still performs power conversion, and
   if the master power converter supplies power in an abnormal manner, the operation state of the master power converter is the second operation state, and the slave power converter responds to the control signal and raises the voltage level of the auxiliary power to the working voltage level, such that the auxiliary power replacing the main power is supplied to the load.

5. The power supply apparatus as recited in claim 1, wherein the master power converter comprises:
a first conversion circuit configured to convert power and generate the main power; and
a first control unit configured to control power conversion of the first conversion circuit and detect an output state of the first conversion circuit.

6. The power supply apparatus as recited in claim 5, wherein the slave power converter comprises:
a second conversion circuit configured to convert power and generate the auxiliary power; and
a second control unit configured to control power conversion of the second conversion circuit and detect an output state of the second conversion circuit.

7. The power supply apparatus as recited in claim 6, wherein the first conversion circuit performs AC-DC conversion on an AC power source so as to generate the main power, and the second conversion circuit performs DC-DC conversion on a DC power source so as to generate the auxiliary power.

8. The power supply apparatus as recited in claim 6, further comprising:
a transmission channel configured to transmit the control signal and power state information between the first control unit and the second control unit, wherein the power state information is associated with the output state of the first conversion circuit and the output state of the second conversion circuit.

9. The power supply apparatus as recited in claim 8, wherein the transmission channel comprises:
a first signal line coupled between the first control unit and the second control unit, the first control unit and the second control unit sharing the power state information through the first signal line; and
a second signal line coupled between the first control unit and the second control unit, the first control unit transmitting the control signal to the second control unit through the second signal line.

10. A power supply apparatus comprising:
an AC power converter configured to perform AC-DC conversion on an AC power source so as to generate a main power having a working voltage level; and
a DC power converter configured to perform DC-DC conversion on a DC power source so as to generate an auxiliary power, wherein the AC power converter and the DC power converter are adapted to be coupled to a load in parallel,
wherein the AC power converter provides a control signal to the DC power converter in response to an operation state of the AC power converter,
if the AC power converter determines the operation state is a first operation state, the DC power converter responds to the control signal and performs power conversion to generate the auxiliary power having a voltage level higher than zero but lower than the working voltage level, such that the DC power converter does not generate an output current to the load even though the DC power converter still performs power conversion, and the main power is supplied to the load, and
if the AC power converter determines the operation state is a second operation state, the DC power converter responds to the control signal and raises the voltage level of the auxiliary power to the working voltage level, such that the auxiliary power replacing the main power is supplied to the load.

11. A power supply method for a power supply apparatus, the power supply method comprising:
respectively providing a main power and an auxiliary power to a load by a master power converter and a slave power converter, wherein the main power has a working voltage level;
determining an operation state of the master power converter;
if the operation state is a first operation state, performing power conversion by the slave power converter to generate the auxiliary power having a voltage level higher than zero but lower than the working voltage level, not generating an output current by the slave power converter to the load even though the slave power converter still performs power conversion, and supplying the main power to the load; and
if the operation state is a second operation state, raising the voltage level of the auxiliary power to the working voltage level and supplying the auxiliary power to the load in replacement of the main power.

12. The power supply method as recited in claim 11, further comprises:
detecting changes of the load for determining the operation state of the master power converter;
if the load is a heavy load, generating the auxiliary power having the working voltage level, such that the main power and the auxiliary power are both supplied to the load;
if the load is a light load, reducing the voltage level of the auxiliary power to be lower than the working voltage level, wherein the master power converter is in the first operation state if the load is the light load; and
if the master power converter supplies power in an abnormal manner, raising the voltage level of the auxiliary power to the working voltage level, such that the auxiliary power replacing the main power is supplied to the load, wherein the master power converter is in the second operation state if the master power converter supplies the power in the abnormal manner.

13. The power supply method as recited in claim 12, wherein the step of detecting the changes of the load comprises:
detecting an output power of the power supply apparatus;
determining whether the output power is less than a predetermined value;
if the output power is less than the predetermined value, determining the load is the light load; and
if the output power is greater than or equal to the predetermined value, determining the load is the heavy load.

14. The power supply method as recited in claim 11, wherein the step of providing the main power and the auxiliary power to the load comprises:
performing AC-DC conversion on an AC power source to generate the main power; and
performing DC-DC conversion on a DC power source to generate the auxiliary power.

* * * * *